Patented Sept. 8, 1936

2,053,319

UNITED STATES PATENT OFFICE 2,053,319

PURIFYING TREATMENT FOR ALKALI METAL PHOSPHATE SOLUTIONS

Louis Block and Max Metziger, Joliet, Ill., assignors to Blockson Chemical Co., Joliet, Ill., a corporation of Illinois No Drawing. Application June 7, 1934, Serial No. 729,359

16 Claims. (Cl. 23—107)

The present invention relates to the removal of fluorine compounds from an essentially monosodium phosphate solution, or from similar salts of the alkali metals.

It has lately been determined that fluorine compounds in small amounts are highly injurious to the human system. Heretofore many preparations have appeared containing fluorine in harmful amounts. This has been particularly true of phosphates, such as sodium phosphates of the several varieties. Phosphates are prepared largely from sources of phosphorous which bear also fluorine compounds, notably phosphate rock. Phosphoric acid is first prepared by numerous processes and then desired salts are made by processes which cause fluorine compounds to remain in the product. By practice of the present invention the phosphate is provided first, largely as monosodium phosphate, and a proper solution of this is treated in a manner to remove a large portion of even small amounts of fluorine compounds present as a contamination.

The process involves the addition of a treating agent in small quantity to a solution of near-monometal phosphate of alkali metal in such a manner that a precipitate eventuates. When this is removed the fluorine compounds are removed with it. The purified solution of the said monometal phosphate is then used for recovery of the phosphate salt therein, or used for conversion to other materials wherein little or no fluorine impurity is desired. These may be food, tonic or medicine.

The object of the invention is to form a precipitate in a solution of monometal phosphate of alkali metal which precipitate is of such a character and is formed under conditions which cause fluorine of compounds in the solution to be carried by the precipitate and to be thus separable from the solution.

A particular object of the invention is the addition of a slurry containing aluminum hydroxide to a hot solution of monometal phosphate of alkali metal.

Another object of the invention is the addition of a slurry containing hydroxides of aluminum and of alkali earth metal to a hot solution of monometal phosphate of alkali metal.

A more specific object of the invention is the addition of a slurry containing mixed aluminum and calcium hydroxides to a hot solution of monometal phosphate of alkali metal.

Various other and ancillary objects and advantages of the invention will become apparent from the following description and explanation of the invention.

One manner of carrying out the invention in a practical way is herein given as a basis for further explanation of the invention. Sodium is the preferred metal of the alkali metal group, and is used herein as an exemplary member for the purpose of explaining the invention.

There is used as raw material phosphoric acid of commerce, produced by a suitable known process such as the pyrolytic one, the electric furnace, the combustion of phosphorous, the wet decompositions or digestions, or the sulphuric acid process. Fluorine is likely to be found in considerable amounts in such phosphoric acid. Alkali sodium, either in the form of caustic soda, carbonate of soda, or bicarbonate of soda, or any mixture of them, is added to the phosphoric acid to form substantially monosodium phosphate. Exact chemical neutralization to this salt form is not necessary. Copious suspension of solid matter results from various impurities. The solid matter is filtered off. The concentration used is such that the filtrate has a specific gravity of about 25° Bé. specific gravity, corresponding to about 25% anhydrous monosodium phosphate. This concentration is not a limiting one. For example, the concentration may be to 50° Bé. at which point a higher degress of separation of impurities is obtained. However, at about 25° Bé. the clean filtrate may contain from 150 to 300 or more parts of fluorine per million parts of solid anhydrous monosodium phosphate.

To 1000 gallons of such solution of about 25% monosodium phosphate at about 70° C. to 80° C. there is added 55 gallons of a treating agent consisting of suspended hydroxides of aluminum and calcium, in the form of 240 lb. of wet aluminum hydroxide (14.4 lb. alumina—$Al_2O_3$) and 24 lb. of hydrated lime—$Ca(OH)_2$. This is prepared as a uniformly mixed slurry. Rather than adding the treating slurry directly to the heated solution, the two are run together from separate sources into a mixing container, using controlled rates of flow to maintain uniformity in proportions of the materials as they mix.

After the treatment, the mixture is agitated and cooled to about normal room temperature. The resulting precipitate is filtered away. The clean filtrate is highly purified (with respect to fluorine) monosodium phosphate liquor. A purity of less than 12 parts fluorine per million parts of anhydrous monosodium phosphate is readily obtained.

Many variations of the process may be made without departing from the spirit and scope of the invention. A near-monosodium phosphate liquor of about 25° Bé. measured at 20° C. appears to yield to the treatment better and more economically than either weaker or stronger near-monosodium phosphate liquors. If the near-monosodium phosphate liquor is of a gravity below 20° Bé., then the removal of fluorine is not as complete as with a liquor of 25° Bé. On the other hand, if a higher concentration of monosodium phosphate liquor, for example, 30° Bé., is used, then it permanently dissolves a greater portion of the treating agent, particularly the alumina present in the treating agent, and correspondingly contaminates the filtrate. Accordingly, preference is given to treating a near-monosodium phosphate liquor having a specific gravity of about 25° Bé.

A temperature of 70° C. or over for treatment of the 25° Bé. solution is preferred in order to cause a sufficient quantity of material from the treating agent to go into solution as a scavenger to gather up the fluorine compounds. On cooling some fluorine complexes precipitate out of the liquid until room temperature is reached.

The manner of adding the treating agent to the monosodium phosphate liquor and the manner of mixing the two together are of great practical importance. Means must be provided so that the treating agent should constantly come in contact with fresh, yet untreated supplies of monosodium phosphate solution which is to be purified with reference to fluorine content. To some extent the treating agent reacts with the monosodium phosphate forming insoluble compounds. Where such compounds are formed in the absence of considerable quantity of fluorine, both the phosphate and the treating agent are wastefully employed. The invention may be used with aluminum hydroxide alone as the treating agent, but it is not so efficient in action as when used in combination with calcium hydroxide as described. One or more of other alkali metal hydroxides such as of barium, strontium and magnesium, may be used with the aluminum hydroxide with or in place of calcium hydroxide. It is pointed out that the aluminum is trivalent and the alkali metal earths are divalent. The aluminum hydroxide is a more gelatinous or flocculent type of precipitate, and the alkali earth metal hydroxides are more granular. The two together act both physically and chemically to purge the solution of fluorine compounds.

The 1000 gallons solution of monosodium phosphate at about 25° Bé. contains about 2000 lb. of anhydrous monosodium phosphate. The described 55 gallons of treating agent contains the effective quantities of 14.4 lb. alumina and 24 lb. of hydrated lime. It is readily seen that the total weight of about 38 lb. of treating agent is effective on about 2000 lb. of anhydrous monosodium phosphate. This is slightly under 1.8% of such treating agent based on anhydrous monosodium phosphate. The ratio is not a critical one and it may be readily appreciated that the ratio may vary considerably. Only a relatively small quantity is required. It should be understood that the active material in the treating agent combines with phosphate to form various phosphate complexes, which include chemically or physically a large proportion or all of the fluorine compounds. It therefore must be appreciated that some phosphate is lost from the solution. However, the precipitated phosphates containing the fluorine compounds may be diverted to other uses wherein human consumption is not concerned.

From the foregoing example and explanation those skilled in the art will be able to carry out the invention in numerous ways departing from the illustrative example herein given. Such changes and modifications are contemplated as falling within the scope of the invention as defined in the appended claims.

We claim:

1. The process of treating a sodium phosphate solution which comprises mixing a water suspension of aluminum hydroxide with a heated solution containing largely monosodium phosphate, cooling the mixture, and separating solid matter, whereby to remove with the solid matter a large proportion of any small amounts of fluorine compounds which may contaminate the sodium phosphate solution.

2. The process of treating a sodium phosphate solution which comprises mixing a water suspension of aluminum hydroxide and calcium hydroxide with a heated solution containing largely monosodium phosphate, cooling the mixture, and separating solid matter, whereby to remove with the solid matter a large proportion of any small amounts of fluorine compounds which may contaminate the sodium phosphate solution.

3. The process of treating a sodium phosphate solution which comprises mixing a water suspension of aluminum hydroxide and alkaline earth metal hydroxide with a heated solution containing largely monosodium phosphate, cooling the mixture, and separating solid matter, whereby to remove with the solid matter a large proportion of any small amounts of fluorine compounds which may contaminate the sodium phosphate solution.

4. The process of treating a sodium phosphate solution which comprises mixing a water suspension of aluminum hydroxide with a heated solution containing about 25% monosodium phosphate, cooling the mixture, and separating solid matter, whereby to remove with the solid matter a large proportion of any small amounts of fluorine compounds which may contaminate the sodium phosphate solution.

5. The process of treating a sodium phosphate solution which comprises mixing a water suspension of aluminum hydroxide with a heated solution containing about 25% monosodium phosphate at a temperature of from about 70° C. to 80° C., cooling the mixture, and separating solid matter, whereby to remove with the solid matter a large proportion of any small amounts of fluorine compounds which may contaminate the sodium phosphate solution.

6. The process of treating a sodium phosphate solution which comprises mixing a water suspension of aluminum hydroxide with a heated solution containing largely monosodium phosphate at a temperature of from about 70° C. to 80° C., cooling the mixture, and separating solid matter, whereby to remove with the solid matter a large proportion of any small amounts of fluorine compounds which may contaminate the sodium phosphate solution.

7. The process of treating a sodium phosphate solution which comprises mixing a water suspension of aluminum hydroxide and calcium hydroxide with a heated solution containing largely monosodium phosphate at a temperature of from about 70° C. to 80° C., cooling the mixture, and separating solid matter, whereby to remove with the solid matter a large proportion of any small amounts of fluorine compounds which may contaminate the sodium phosphate solution.

8. The process of treating a sodium phosphate solution which comprises mixing a water suspension of aluminum hydroxide and alkali earth metal hydroxide with a heated solution containing largely monosodium phosphate at a temperature of from about 70° C. to 80° C., cooling the mixture, and separating solid matter, whereby to remove with the solid matter a large proportion of any small amounts of fluorine compounds which may contaminate the sodium phosphate solution.

9. The process of treating near-monosodium phosphate solution which comprises running together in substantially constant quantity ratio and subsequently mixing two volumes of liquid, one being a very large volume of a hot solution of near-monosodium phosphate liquor, and the other being a small volume of water having in suspension aluminum hydroxide whereby to form insoluble phosphate, the formation of which scavenges the solution of fluorine compounds.

10. The process of treating near-monosodium phosphate solution which comprises running together in substantially constant quantity ratio and subsequently mixing two volumes of liquid, one being a very large volume of a hot solution of near-monosodium phosphate liquor, and the other being a small volume of water having in suspension aluminum hydroxide and calcium hydroxide whereby to form insoluble phosphates, the formation of which scavenges the solution of fluorine compounds.

11. The process of treating near-monosodium phosphate solution which comprises running together in substantially constant quantity ratio and subsequently mixing two volumes of liquid, one being a very large volume of a hot solution of near-monosodium phosphate liquor, and the other being a small volume of water having in suspension aluminum hydroxide and alkali earth metal hydroxide whereby to form insoluble phosphates, the formation of which scavenges the solution of fluorine compounds.

12. The process of treating an alkali metal phosphate solution which comprises mixing a water suspension of aluminum hydroxide with a heated solution containing largely monometal phosphate of alkali metal, cooling the mixture, and separating solid matter, whereby to remove with the solid matter a large proportion of any small amounts of fluorine compounds which may contaminate the alkali metal phosphate solution.

13. The process of treating an alkali metal phosphate solution which comprises mixing a water suspension of aluminum hydroxide and calcium hydroxide with a heated solution containing largely monometal phosphate of alkali metal, cooling the mixture, and separating solid matter, whereby to remove with the solid matter a large proportion of any small amounts of fluorine compounds which may contaminate the alkali metal phosphate solution.

14. The process of treating an alkali metal phosphate solution which comprises mixing a water suspension of aluminum hydroxide and alkaline earth metal hydroxide with a heated solution containing largely monometal phosphate of alkali metal, cooling the mixture, and separating solid matter, whereby to remove with the solid matter a large proportion of any small amounts of fluorine compounds which may contaminate the alkali metal phosphate solution.

15. The process of treating a solution of near-monometal phosphate of alkali metal which comprises running together in substantially constant quantity ratio and subsequently mixing two volumes of liquid, one being a very large volume of a hot solution of the said phosphate, and the other being a small volume of water having in suspension aluminum hydroxide whereby to form insoluble phosphate, the formation of which scavenges the solution of fluorine compounds.

16. The process of treating a solution of near-monometal phosphate of alkali metal which comprises running together in substantially constant quantity ratio and subsequently mixing two volumes of liquid, one being a very large volume of a hot solution of said phosphate, and the other being a small volume of water having in suspension aluminum hydroxide and alkali earth metal hydroxide whereby to form insoluble phosphates, the formation of which scavenges the solution of fluorine compounds.

LOUIS BLOCK.
MAX METZIGER.